United States Patent [19]
Reeder

[11] 3,944,721
[45] Mar. 16, 1976

[54] MULTICONDUCTOR WIRE SPLICE DEVICE

[75] Inventor: Larry R. Reeder, San Jose, Calif.

[73] Assignee: Raychem Corporation, Menlo Park, Calif.

[22] Filed: July 16, 1974

[21] Appl. No.: 488,902

[52] U.S. Cl. ......... 174/88 R; 174/84 C; 174/138 F; 339/217 R
[51] Int. Cl.² ........................................ H02G 15/08
[58] Field of Search ... 174/88 R, 88 S, 84 R, 138 F, 174/87; 339/217 R, 205, 211, 213

[56] References Cited
UNITED STATES PATENTS

| | | | |
|---|---|---|---|
| 2,396,725 | 3/1946 | Thomas, Jr. | 174/88 R X |
| 2,923,761 | 2/1960 | Stevens, Jr. | 174/88 R X |
| 3,317,658 | 5/1967 | Smith | 174/88 R X |

*Primary Examiner*—Darrell L. Clay
*Attorney, Agent, or Firm*—Lyon and Lyon

[57] ABSTRACT

A device for splicing multiconductor wires is provided to achieve splices of balanced length whereby each conductor of the wire carries a substantially equal tensile load. First and second crimp barrels are mounted in a frame having shoulders at opposite ends. Stripped wire conductors are respectively inserted at each end and the conductors are crimped in the barrels. The frame is dimensioned to provide substantially equal tensile loading on each conductor of the wire.

10 Claims, 6 Drawing Figures

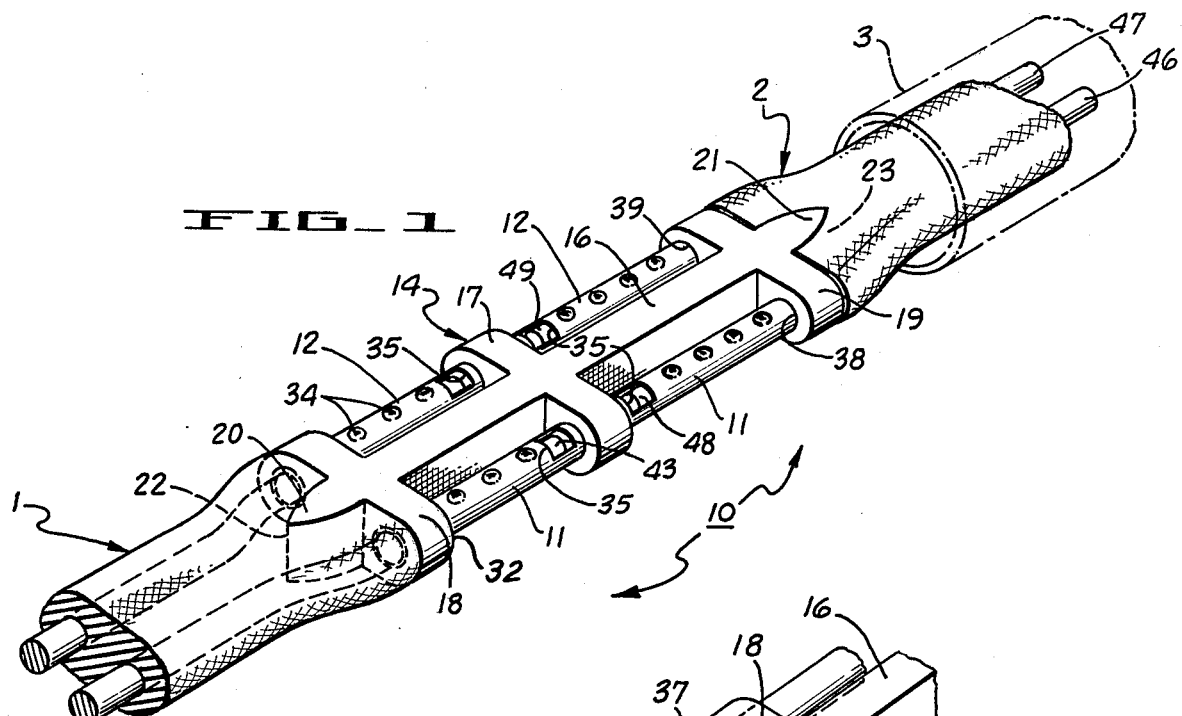
FIG_1
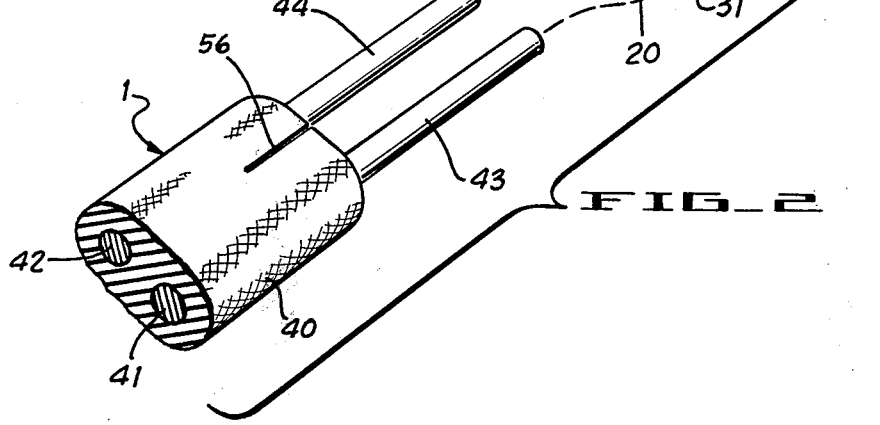
FIG_2
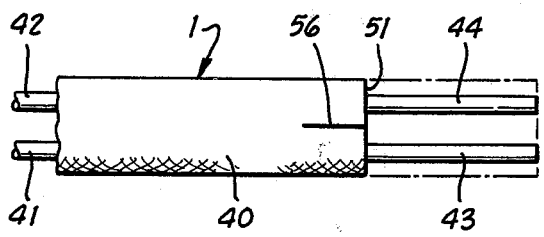
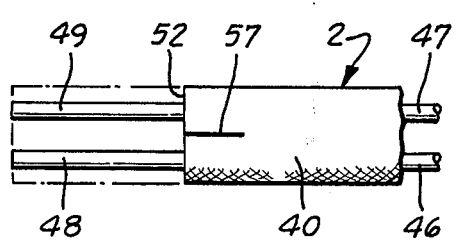
FIG_3

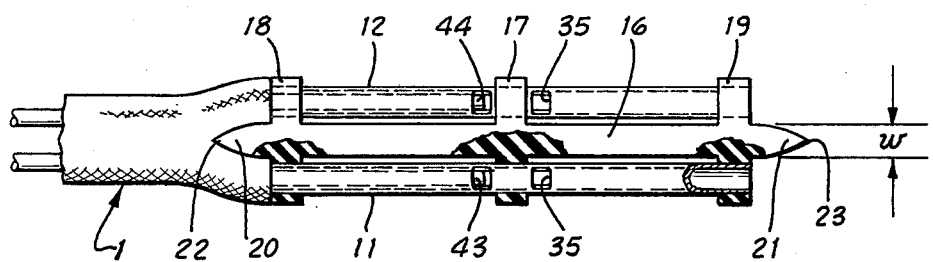
FIG_4
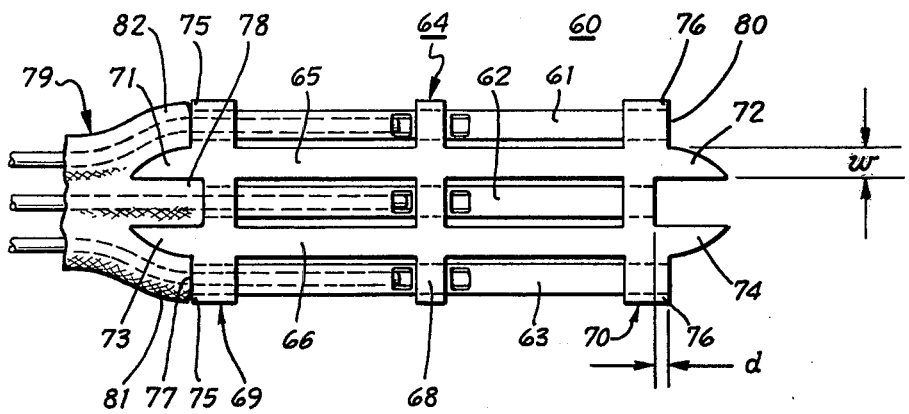
FIG_5
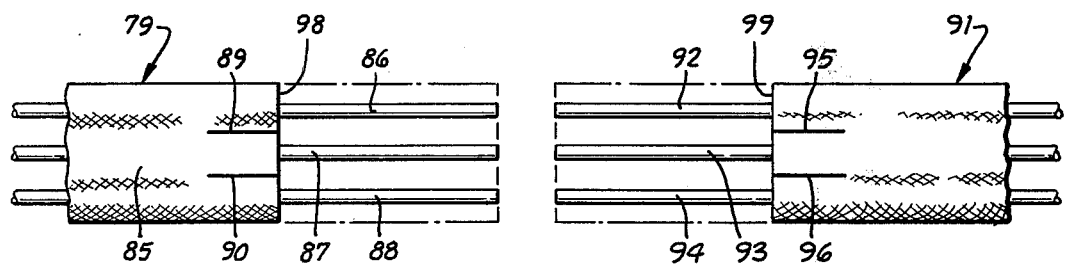
FIG_6

MULTICONDUCTOR WIRE SPLICE DEVICE

BACKGROUND OF THE INVENTION

This invention relates to electrical connections, and more particularly to a splice device.

The term multiconductor wire in the present specification is utilized to denote a wire such as a telephone cable or other means including a plurality of conductors which may be separately insulated and all covered in a common insulating jacket. Other variations are well known. The multiconductor wire is also referred to by those skilled in the art as a multiwire cable.

It is a common requirement that the conductors at the end of the first multiconductor wire be spliced to conductors at the end of a second multiconductor wire. One application in which this arises is in the use of a multiconductor wire as a telephone cable. Telephone cables are strung from telephone pole to a house. The multiconductor wire comprising the drop line is spliced to a wire at the telephone pole. A first conductor of the first wire is spliced to a first conductor of the second wire. Similarly, a second conductor of the first wire is spliced to a second conductor of the second wire. It is well known to perform this splicing by removing the outer cable jacket and stripping the individual conductors adjacent to the end of each wire. The first conductors of each wire may be spliced together in a first crimp barrel. Similarly, the second conductors of each wire may be spliced together in a second crimp barrel. In order to complete the splice connection, it is necessary to electrically isolate the two crimp barrels from each other, for example as by use of an insulating tape, and to provide overall insulation of the spliced area. It is a common result of such an operation to provide splices of unequal length. In other words, the distance from a reference point adjacent the stripped end of the first wire to a reference point adjacent the stripped end of the second wire when traced along the first conductor splice is different from that traced along the second conductor splice.

This difference in splice lengths present a physical disadvantage. In applications such as a telephone drop line splice, the splice bears a tensile load of at least a portion of cable. In typical uses, the splice bears the weight of an entire telephone cable running from a telephone pole to a house. In certain climates in winter seasons, the tensile load on the drop line may be markedly increased by the weight of icicles which form on and hang from the suspended telephone cable. Where splice lengths of first and second conductors are unequal, the entire tensile load is borne by the shorter of the two spice conductors. This splice conductor under load must elongate substantially until it is equal in length to the second splice before any of the load is transferred to the second splice. It has been the experience of telephone companies, for example, that overstressing and breaking of the first splice connection results.

Due to difficulty in performing the above-described splicing process in the field, telephone companies will frequently ship broken cables back to their shops, increasing expense in repair.

SUMMARY OF THE INVENTION

It is therefore an object of the present invention to provide a multiconductor wire splice device for providing a multiconductor splice in which tensile load is borne substantially equal by each of a plurality of conductors, whereby tensile strength of the splice connection is increased.

It is also an object of the present invention to provide a splice device of the type described which is reliable in use.

It is further an object of the present invention to provide a splice device of the type described which is simple to use and comprises one assembly rather than a plurality of discrete parts.

It is also a general object of the present invention to provide a splice device of the type described in which splice lengths of balanced length may be provided between conductors even where stripped conductor ends may be of unequal length.

Briefly stated, in accordance with the present invention, there is provided a splice device in which a plurality of splice barrels are mounted, each splice barrel for receiving a conductor from first and second wires. The splice barrels are mounted in a frame. The frame receives stripped ends of conductors of first and second wires and a plurality of splices are made. The frame is dimensioned to provide substantially equal tensile loading on each spliced conductor. In this manner, balanced splice lengths for each conductor of the first and second wires are provided.

BRIEF DESCRIPTION OF THE DRAWINGS

The means by which the foregoing objects and features of novelty are achieved are pointed out with particularity in the claims forming the concluding portion of the specification. The invention, both as to its organizaton and manner of operation, may be further understood by reference to the following description taken in connection with the following drawing.

Of the drawings:

FIG. 1 is a prespective illustration of first and second multiconductor wires spliced in a device constructed in accordance with the present invention;

FIG. 2 is an exploded partial view of FIG. 1;

FIG. 3 is a plan view of first and second mutliconductor wires prepared for splicing in accordance with the present invention;

FIG. 4 is a plan view, partly broken away, of FIG. 1;

FIG. 5 is a plan view of a further embodiment of the present invention utilized for splicing multiconductor wires each including more than two conductors; and, FIG. 6 is a plan view of a three-conductor wire prepared for installation in FIG. 5.

DESCRIPTION OF THE PREFERRED EMBODIMENTS

Referring now to FIG. 1, a first multiconductor wire 1 is spliced to a second multiconductor wire 2 which may have an outer jacket 3 by means of a splice device 10 constructed in accordance with the present invention. In the preferred embodiment for splicing two-conductor wires, the splice device 10 includes first and second splice barrels 11 and 12 which are of equal length and held parallel to each other at a predetermined, fixed distance by an insulative frame 14. The frame 14 includes an axial leg 16 spaced intermediate the splice barrels 11 and 12, a central transverse leg 17 is provided for supporting the axial centers of the splice barrels 11 and 12 from the axial leg 16. The term outer with respect to the axial direction means closer to the conductor 1 or the conductor 2 as is readily apparent in context, and the term outer in a transverse direction means away from the center of the axial leg 16. First and second outer transverse legs 18 and 19 are provided for abutting the wires 1 and 2 respectively and for supporting the ends of the splice barrels 11 and 12 to the axial leg 16. Outer wedge members 20 and 21 are provided respectively extending from opposite ends of the axial leg 16 adjacent the wires 1 and 2 respectively. The members 20 and 21 preferably have an inner end the same width as the leg 16 and are each tapered to an outer edge 22 and 23 respectively.

In the preferred embodiment, the legs 16, 18 and 19 are parallel, and the leg 17 is equidistantly spaced from the legs 18 and 19. The axial width of the legs 17, 18 and 19, and the transverse length thereof is chosen so that the outer ends of the legs 17, 18 and 19 surround the splice barrels 11 or 12 and provide structural integrity for the frame 14. Dimensioning of the axial leg 16 and transverse legs 17, 18 and 19 is a function of the size of the conductors to be spliced, the distance between adjacent conductors of the wires 1 and 2, the size of the splice barrels 11 and 12, and the material of which the frame 10 is constructed. The frame 14 may be constructed of any of a number of well-known nonconductive materials. The outer transverse leg 18 has an outer face 31 (FIG. 2) which is normal to the axial leg 16. Similarly, the outer leg 19 has an outer transverse face 32. The outer transverse leg 18 has bores 36 and 37 for receiving and holding first ends of the splice barrels 11 and 12 respectively. Bores 38 and 39 in the outer transverse leg 19 respectively retain second ends of the splice barrels 11 and 12.

Referring to the splice barrels 11 and 12 in greater detail, they may comprise any suitable means for joining ends of conductors from first and second wires. In the preferred embodiment, the splice barrels 11 and 12 comprise well-known crimp barrels. Conductor ends described further below in the splice barrels 11 and 12 may be secured by means of crimps 34 (FIG. 1). The transverse legs 17, 18 and 19 and the axial leg 16 may act as guides and alignment means for a crimping tool in order to provide a fast, efficient, simplified and uniform crimping. Simultaneous crimping of both crimp barrels at one end is facilitated, enhancing ease of insertion of either wire 1 or 2. The crimp barrels 11 and 12 may be provided with inspection ports 35, preferably adjacent either side of the leg 17 for verifying the presence of a conductor before and after crimping. As seen in FIGS. 1, 2 and 3, the wires 1 and 2 are covered by insulation 40 which houses and spaces first and second conductors 41 and 42 in the wire 1. The first and second conductors 41 and 42 have respective ends 43 and 44. The wire 2 contains first and second conductors 46 and 47 having ends 48 and 49.

FIG. 3 is an illustration of the wires 1 and 2 prepared for insertion in the splice device 10. Dotted lines indicate where outer jacketing and insulation has been removed from conductor end 43 and 44 of the wire 1 and from conductor ends 48 and 49 of the wire 2. The insulation 40 is cut square with respect to each conductor to provide a face 51 on the wire 1 and a face 52 on the wire 2. Cutting square is a well-known term in the art indicating that the wire ends may rest flush against the outer transverse faces 31 and 32 respectively of the splice device 10. Additionally, a slot 56 may be cut in the wire 1 and slot 57 may be cut in the wire 2 at the cut end of the insulation 40 parallel to and equidistant from the conductor ends 43 and 44 and the conductor ends 48 and 49 respectively. The length of the slot 56 and of the slot 57 respectively are substantially equal to the axial lengths of the end pieces 20 and 21 respectively. This is an operation used to improve reliability of the resulting connection. It is well-known that moisture dust or other materials may enter a connection and provide what is known as a tracking path between conductors 41 and 42 or between conductors 46 and 47 along the face 51 of the insulation 40. The purpose of cutting a slot such as the slots 56 and 57 is to increase the length of the above-described tracking path, thus improving electrical isolation. The slots 56 and 57 may be formed by well-known cutting means. Alternatively, the end or wedge pieces 20 and 21 may respectively be provided with cutting surfaces comprising the edges 22 and 23 so that the formation of the slot 56 or 57 may be accomplished simply by inserting the wires 1 and 2 into the splice device 10 with the edges 22 and 23 forming the slot as the wires are inserted.

FIG. 4 is an illustration of an assembly in accordance with the present invention. FIG. 4 is partly broken away to better show the relationship of the crimp barrel 11 to the transverse arms 17, 18 and 19 and the unity of the crimp barrel through the length of the splice device 10. In FIG. 4, first and second conductor ends 43 and 44 of the wire 1 are respectively received in the crimp barrels 11 and 12.

In use, similar operations are performed on both the wires 1 and 2. Operations are performed on the wire 2 which are performed corresponding to the following with respect to the wire 1. As indicated in FIG. 3, insulation 40 is stripped from the wire 1 to expose the first and second conductor ends 43 and 44 and to form the insulation face 51. The invention enables a user holding the wire 1 to insert the conductor ends 43 and 44 simultaneously into first ends of the splice barrels 11 and 12 respectively. The insulation face 51 abuts the outer face 31 or the outer transverse leg 18 (FIG. 4). As the insulation 40 passes over the wedge member 20, the face 51 of the insulation 40 is modified. The resulting face 51 is referred to as the formed face 51. In FIG. 4, the formed face 51 mates with the outer face 31 of the outer transverse leg 18, and is retained in position by means of crimping or otherwise securing the conductor ends 43 and 44 in the splice barrels 11 and 12. The wire 1 is mounted in the splice device 10 so that there is no slack on individual conductors.

Because the conductor ends 43 and 44 are retained in splice barrels 11 and 12, they need not be of uniform length as illustrated in FIG. 2. Because lengths of conductor ends 43 and 44 need not be equal, complexity of operation in the field or in a shop to perform a splice is markedly reduced. In the preferred embodiment, the total lengths of the first conductor ends 43 and 48 are less than the length of the splice barrel 11. The user is thus given a relatively greater amount of latitude in preparing the conductor ends 43, 44, 48 and 49.

The splice barrels 11 and 12 provide a rigid, uniform connection between the outer transverse legs 18 and 19. Therefore, the spatial relationship of the wires 1 and 2 to the splice device 10 is substantially identical under tensile load and no-load conditions. Therefore, substantially equal tensile load is applied to each conductor of each wire 1 and 2. In order to provide this "no-slack" condition it is preferred that the formed conductor faces 51 and 52 mate as exactly as is practical with the outer transverse faces 31 and 32 of the outer transverse legs 18 and 19. This may be done by cutting the insulation 40 square and providing flat (except for the wedge members 20 and 21) faces 31 and 32. In order to minimize vector multiplication of tensile load, it is preferred that the faces 31 and 32 be parallel and in transverse registration. The wedge members also mate with the formed insulation faces 51 and 52 to assist in maintaining the desired spatial relationships specified above which yield the desired loading characteristics.

The range of tensile forces to be applied to the splice device 10 in a given application is generally predetermined. Application of tensile load on the wires 1 and 2 results in a compressive load applied to the frame 14. The frame 14 is constructed of material which is rigid to the predetermined range of compressive load to be applied. Suitable materials are well-known, and selection of an appropriate material is readily apparent to one having ordinary skill in the art.

Although many relative dispositions of the splice barrels 11 and 12 may be provided in accordance with the present invention to provide the above-described spatial and tensile load relationships, it is preferred that they be mounted parallel to each other. In this manner, the effect of dividing the tensile load F by cosine theta, where theta is an angle between the applied force and a crimp barrel, is avoided. Loading characteristics may also be improved since in use, the wires 1 and 2 will generally be the same size, and a splice device 10 will generally be made for preferably accomodating one size of multiconductor wire. Therefore, in the preferred form, the splice barrels 11 and 12 are mounted such that their centerline distances (distance from the transverse center of one to the transverse center of another) is substantially equal to the centerline distances of the conductors 41 and 42 in the insulation 40 plus the width $w$ (FIG. 4) of the wedge member 23 at its base (i.e., where the wedge member 23 intersects the outer transverse leg 18). It should be noted that the frame 14 may be constructed without wedge members 20 and 21. In this case, the width $w$ is equal to zero.

Referring now to FIG. 5, there is illustrated a further embodiment of the present invention for providing a rigid splice between first and second wires having more than two conductors. A splice device 60 is provided including parallel splice barrels 61, 62, and 63. The splice barrels 61, 62 and 63 are maintained in a splice frame 64 having a first axial leg 65 positioned intermediate the splice barrels 61 and 62 and a second axial leg 66 positioned intermediate the splice barrels 62 and 63. The axial legs 65 and 66 are joined by a central transverse leg 68 and outer transverse legs 69 and 70. The splice barrels 61, 62 and 63 extend through the legs 68, 69 and 70 and terminate with the outer faces 77 and 80 of the outer transverse legs 69 and 70. Wedge members 71 and 72 are provided extending from opposite ends of the axial leg 65. Wedge members 73 and 74 extend from opposite ends of the axial leg 66. Inner faces of the wedge members 71 and 73 are parallel and define a recess for receiving a central insulated conductor 78 of a three-conductor wire 79. Outer faces of the wedge members 71 and 73 are curved for guiding outer insulated conductors 81 and 82 of the three-conductor wire 79 toward the splice barrels 61 and 63, respectively. As seen in FIG. 6, the three-conductor wire 79 may be prepared for insertion in the splice device 60 by cutting insulation 85 square with respect to conductors 86, 87 and 88. Slots 89 and 90 may be formed adjacent the insulated conductors 81 and 73 and 82 respectively. As in the embodiment of FIG. 1, formation of the slots 89 and 90 may be performed by cutting or by insertion over sharp edges at the outer ends of the wedge members 71 and 73. A second three-wire conductor 91 having conductors 92, 93 and 94 may be similarly prepared with slots 95 and 96 and inserted at the opposite end of the splice device 60. The wire 79 has an insulation face 98, and the wire 91 has an insulation face 99.

In order to provide for a rigid connection an offset shoulder 75 is provided on the transverse face 77, and an offset shoulder 76 is provided on the outer face 80 of the transverse leg 70. In other words, the portion of the transverse leg 69 receiving the insulated conductor 78 is recessed a distance $d$ (FIG. 5) with respect to the portions of the transverse leg 69 which receive the insulated conductors 81 and 82. Therefore, the wire 79 may be conveniently stripped square as shown in FIG. 6, and when inserted in the splice device 60, the formed insulation face 98 mates with the face 77 of the outer transverse leg 69 despite the spreading of the insulated conductors 98, 81 and 82. Similarly, the formed insulation face 99 mates with the face 80 of the outer transverse leg 70. Completions of the electrical connections is completed as in the embodiment of FIG. 1.

Thus in this embodiment also, equal tensile loading on conductors is maintained. The present invention provides for the most facile stripping of conductors and for abutting exposed insulation ends squarely against the splicing device. Within the splicing device, equality of splice length is maintained. Constant length splice barrels may be provided between the opposite outer transverse legs of the splice device 10 or 60. Ends of the splice barrels 61 and 63 may terminate in the axial middle of the outer transverse legs 69 and 70 if desired. Desired spatial relationships are provided in accordance with the above teachings recited with respect to FIGS. 1 through 4. Thus equal tensile loading is maintained on each conductor in a multiconductor wire.

The foregoing specification has been written with a view toward enabling those skilled in the art to make many modifications in the specific embodiments disclosed to provide a splice device constructed in accordance with the present invention. For example, specific dimensions of the transverse and axial legs may be varied. Means for supporting the splice barrels other than transverse legs per se may be utilized. Other modifications will readily suggest themselves to those skilled in the art.

What is claimed as new and desired to be secured by Letters Patent of the United States is:

1. A multiconductor wire splice device for splicing first and second wires so as to substantially equalize any tensile loading on the conductors of said first and second wires, each wire containing a plurality of conductors housed in insulation and being stripped to expose an insulation face and conductor ends, said splice device comprising, in combination:

a plurality of splice barrels, each splice barrel for receiving a conductor end of said first wire and a conductor end of said second wire and for providing an electrical connection and a rigid mechanical connection between said conductor ends;

a frame supporting said splice barrels in spaced parallel relationship, said frame being rigid with respect to a predetermined level of tensile load to be applied to said wires, said frame being further defined as comprising an axial leg mounted intermediate said splice barrels and first and second transverse legs extending from said axial leg and supporting said splice barrels; and, outer faces formed on said transverse legs on opposite ends of said frame for abutting the exposed insulation faces of said first and second wires respectively, said outer faces being further provided with at least one wedge member adapted for insertion between said conductors of said wires and extending outwardly from said frame.

2. The splice device according to claim 1 wherein said plurality of splice barrels comprises a first and second splice barrel mounted in mutually parallel relationship to said axial leg, whereby vector multiplication of axial tensile forces applied to said splice barrels is minimized.

3. The splice device of claim 1 wherein said outer faces are parallel, whereby improved mating is provided with square cut insulation faces of said wires.

4. The splice device of claim 3 further comprising first and second wedge members extending outwardly from opposite ends of said axial leg respectively, said wedge members for providing insulated conductors at said end faces and providing an increased tracking path therebetween.

5. The splice device according to claim 4 wherein said wedge members are formed with sharp outer edges for forming a slot in insulation pushed over one of said edges toward one of said outer faces to form said insulation face of one of said wires.

6. The splice device of claim 5 wherein the centerline distance between said splice barrels at one of said outer faces is equal to the centerline distance between first and second conductors in a selected wire plus the width of the wedge member at the said outer face.

7. A multiconductor wire splice device for splicing first and second wires, each wire containing three conductors housed in insulation and being stripped to expose an insulation face and conductor ends, said splice device comprising, in combination:

three splice barrels, each splice barrel for receiving a conductor end of said first wire and a conductor end of said second wire and for providing an electrical connection and a rigid mechanical connection between said conductor ends;

a frame supporting said splice barrels in spaced parallel relationship said frame further comprising:

outer faces on opposite ends of said frame for abutting the exposed insulation faces of said first and second wires respectively;

a first axial leg mounted parallel to and intermediate the first and second splice barrels and a second axial leg mounted parallel to and intermediate the second and third splice barrels;

first and second outer transverse legs extending from said first and second axial legs and supporting said splice barrels; and, two wedge members each respectively extending from each of said outer faces of said outer transverse legs in registration with an opposite end of one of said first and second axial legs respectively, said wedge members being formed such that a parallel recess is formed in registration with said second splice barrel and having surfaces for directing insulated conductors from a center conductor toward positions in registration with said first and third splice barrels respectively.

8. The splice device according to claim 7 wherein said wedge members are provided with sharp outer edges for forming slots in insulation inserted over said wedge members toward said outer faces, whereby said insulation faces of said first and second wires are formed.

9. The splice according to claim 7 wherein said outer faces of said outer transverse legs are provided with offset shoulders dimensioned such that the proportion of said outer face receiving said first and third conductors of a multiconductor wire are displaced with respect to the portion of the outer face for receiving the center conductor of said three-conductor wire whereby a formed face of square cut insulation on one of said wires mates with an outer face of an outer transverse leg.

10. The device claimed in claim 7 wherein said first and second multiconductor wires each contain three conductors, said frame supports three splice barrels and said portion of said frame being adapted for abutting said insulation material is provided with offset shoulders adjacent the abutment of the insulation about the outer two conductors of said first and second multiconductor wires.

* * * * *